United States Patent [19]

Arai et al.

[11] Patent Number: 4,936,504

[45] Date of Patent: Jun. 26, 1990

[54] PROCESS FOR PRODUCING A CLAD PLATE

[75] Inventors: Hiroshi Arai; Seiichi Takeda; Masahiro Sasaki; Kazuhisa Yokoyama, all of Kanagawa, Japan

[73] Assignee: Nippon Metal Industry Co., Ltd., Shinjuku, Japan

[21] Appl. No.: 384,762

[22] Filed: Jul. 25, 1989

[30] Foreign Application Priority Data

Jul. 25, 1988 [JP] Japan .................................. 63-183518

[51] Int. Cl.[5] ...................... B23K 20/00; B23K 20/14; B23K 20/16

[52] U.S. Cl. ..................................... 228/190; 228/193; 228/243; 228/127; 228/173.2

[58] Field of Search ............... 228/190, 193, 189, 118, 228/127, 132, 173.2, 194, 243; 219/78.02

[56] References Cited

U.S. PATENT DOCUMENTS

| | | | |
|---|---|---|---|
| 2,267,665 | 12/1941 | Raydt et al. ........................ | 228/127 |
| 2,269,523 | 1/1942 | Deutsch ............................. | 228/190 |
| 3,762,032 | 10/1973 | Boujing et al. ..................... | 228/127 |
| 3,918,623 | 11/1975 | Ishiguro et al. .................... | 228/193 |

FOREIGN PATENT DOCUMENTS

| | | | |
|---|---|---|---|
| 195591 | 12/1982 | Japan ................................. | 228/127 |
| 464418 | 9/1975 | U.S.S.R. ............................. | 228/127 |
| 637228 | 12/1978 | U.S.S.R. ............................. | 228/127 |
| 715258 | 2/1980 | U.S.S.R. ............................. | 228/127 |
| 1087304 | 10/1967 | United Kingdom . | |
| 1247282 | 9/1971 | United Kingdom . | |
| 1398856 | 6/1975 | United Kingdom . | |

Primary Examiner—Nicholas P. Godici
Assistant Examiner—Samuel M. Heinrich
Attorney, Agent, or Firm—Wenderoth, Lind & Ponack

[57] ABSTRACT

The present invention provides a process for producing a clad plate which comprises a first step of forming a coil by taking up two or more metal sheets as clad materials and a thin sheet of heat-resistant steel which works as a separator material while these members are overlaid on one another and a second step of vacuum heat-treating the resultant coil.

15 Claims, No Drawings

PROCESS FOR PRODUCING A CLAD PLATE

FIELD OF THE INVENTION

This invention relates to a novel process for producing a clad plate. More specifically, it relates to a process for producing a clad plate in which a clad plate having a large width can be produced by a simple procedure and at low costs.

PRIOR ART OF THE INVENTION

A clad plate is produced, in general, by bonding two or more metal sheets, which are clad materials, together under pressure by cold rolling. In another case, metal sheets are also bonded by hot rolling and then extended thinly by cold rolling. In actual practice, however, the process in the latter case is limited to the production of a clad plate from metals having similar strengths. For example, in case of a clad plate consisting of copper and stainless steel, since the strength differs to a great extent between these two clad materials, only one of these two materials is hence deformed by rolling, and the plate thickness ratio of the resultant clad plate is likely to vary depending upon places of the clad plate. The fact is that no proper clad plate can be produced in such a combination. The cold bonding under pressure permits bonding of metallic alloys in considerably various combinations, but it requires high rolling pressure, requiring a large-size and powerful rolling mill as compared with ordinary rolling. As a result, large-scale production facilities and high production costs are required. Besides the aspect of facilities, there is another problem of deformation such as curling and canoeing, and it is therefore difficult to produce a clad plate having a large width.

A clad plate is also produced by overlaying metal sheets and subjecting the resultant combined sheets to diffusion treatment at a high temperature to bond them, i.e. by a diffusion bonding process. However, this process is usable only to produce plates having a small area, and hence requires high production costs.

SUMMARY OF THE INVENTION

It is an object of the present invention to provide a process for producing a clad plate having a large area with ease and at comparatively low costs.

It is another object of this invention to provide a process for producing a clad plate having a large area at low costs by applying a diffusion bonding process to a coil of the clad plate.

The present invention provides a process for producing a clad plate which comprises a first step of forming a coil by taking up two or more metal sheets as clad materials and a thin sheet of heat-resistant steel which works as a separator material while these members are overlaid on one another and a second step of vacuum heat-treating the resultant coil.

DETAILED DESCRIPTION OF THE INVENTION

In the present invention, when the coil is formed by taking up clad materials, a separator material is required to be present between turns of a clad plate in order to prevent the turns of the clad plate from sticking to each other. This requirement makes it possible, in turn, to give a neat finish to the surfaces of a clad plate by using, as a separator material, a heat-resistant steel having a thin oxide film to a temper color degree on the surfaces.

In addition, the heatresistant steel which works as the separator material is not limited to steels subjected to temper color treatment. Steels subjected to ordinary annealing treatment or bright annealing treatment may be used depending upon types of clad materials and temperatures for heat treatment if they have a very thin oxide film on the surfaces.

In order to bond at least two metal sheets in the entire interface therebetween at a high temperature, it is necessary to exert pressure on the interface. For this reason, metal sheets are taken up by using a material having a high coefficient of thermal expansion (e.g. austenitic stainless steel) as a core material and such that a material having a low coefficient of thermal expansion (e.g. ferritic stainless steel, invar, or the like) is finally present on the outer side of the coil and works as a tightening frame. Then, the pressure is spontaneously exerted by heating. The separator material or one of at least two metal sheets may be used as the material having a low coefficient of thermal expansion. When the number of turns of the coil increases, the pressure hardly reaches the center of the coil, and therefore, the bonding of at least two metal sheets constituting a clad plate sometimes results in nonuniformity. In such a case, the separator material and the clad materials (at least two metal sheets) may be taken up to form a coil by arranging the separator material as an innermost layer of each turn and also by arranging at least two metal sheets such that a metal sheet having a low coefficient of thermal expansion is present on the outer circumference side of each turn and a metal sheet having a high coefficient of thermal expansion is present on the inner circumference side of each turn. Then, a difference in thermal expansion by heating can be utilized to apply pressure up to the center of the coil.

The use of the core material is not always required to form the coil. However, when the number of turns of the coil is large, the pressure applied, when heated, on the central side of the coil is not always sufficient, and it is therefore preferable to use the core material. If the core material is used, it is necessary to start the take-up procedure such that the separator material is present on the core material side. The reason is that the separator material prevents the bonding of a metal sheet as a clad material to the core material. Even if the core material is not used, it is preferable to start the take-up procedure such that a heatresistant steel is present as an innermost turn of the coil. That is because this procedure gives excellent effects on workability of the coil winding and improvement of yield. The heat-resistant steel mentioned here may be the separator material or one of at least two metal sheets which constitute a clad plate.

When a metal sheet, which has low strength at high temperature and is likely to cause creep, is used as one of clad materials, stress to be generated in the bonding interface at a bonding temperature sometimes dissipates, which dissipation makes it difficult to achieve uniform bonding. In such a case, it is preferable to arrange a metal sheet having low strength at high temperature between the separator material and a metal sheet having high strength at high temperature thereby to prevent dissipation of thermal stress in the bonding interface and accomplish the uniform bonding.

The pressures exerted only by tight take-up and difference in thermal expansion are in some cases insufficient for the sufficient bonding. Examples of such cases are that the difference in the coefficients of thermal expansion of at least two metal sheets as clad materials is small, that one or more of at least two metal sheets as clad materials is likely to cause an oxide film thereon and exhibit poor bonding ability, that the thickness of one or more of at least two metal sheets as clad materials is not sufficiently uniform, and others. In these cases, the bonding ability can be improved by arranging a solder in interface(s) formed by the metal sheets, whereby it is possible to obtain uniform intersheet bonding. When one of at least two metal sheets as clad materials is a stainless steel, the stainless steel sheet may be bonded to the other metal sheet through a thin Ni layer formed on at least one of the surfaces of the stainless steel sheet. The thin nickel layer may be formed by cladding or plating.

Preferred examples of at least two metal sheets as clad materials include those having a thickness of between 4 μm and 30 mm. When the metal sheet has a thickness of less than 4 μm, the hot-rolling of the metal sheet as a clad material is difficult and increases production costs. When the thickness of the metal sheet exceeds 30 mm, the product of a clad plate therefrom not only require a large-size take-up device, but also a large-size vacuum heat-treatment apparatus. Further, it is also difficult to straighten the resultant clad plate.

The purpose in the vacuum heat-treating step of the present invention is to promote intermetal diffusion of metal atoms of at least two metal sheets which constitute a clad plate and to increase the intermetal difference in coefficient of thermal expansion by heating thereby to increase intermetal pressure to be exerted by thermal expansion. The intermetal pressure is also generated in a cooling step after the heating. It is because of prevention of metal oxidation and oxide film formation at a high temperture and void formation at the interface caused by the atmosphere gases that the heat-treating step is carried out in a vacuum. In the heat-treating step, the degree of vacuum, heating temperature and heating time are suitably determined depending upon kinds of metal sheets as clad materials, plate thicknesses, coil sides, and the like. In general, the degree of vacuum is preferably $1 \times 10^0$ to $1 \times 10^{-7}$ Torr.

In the heat-treating step, the coil is heated in a furnace under a vacuum until it reaches a predetermined temperature, held for a predetermined period of time, and, cooled to a temperature of between about 600° C. and about 700° C. under a vacuum, and then the coil is cooled to room temperature under an atmospheric pressure or nitrogen gas atmosphere.

According to the present invention clad plates having a large width can be produced simply and at low costs by vacuum heat-treating even without using any large-size rolling mill.

The present invention will be illustrated more in detail with reference to Examples.

EXAMPLE 1

Clad plate of nickel and stainless steel:

It is difficult to produce any clad plate by rolling clad materials of nickel and stainless steel sheets having a thickness ratio of about 1:1, due to problems of curling, etc. However, a nickel-clad stainless steel having a small nickel thickness is free from the curling problem, and can be easily produced by rolling. For this reason, it was attempted to produce a nickel-clad stainless steel having a high nickel thickness ratio by using a nickel-clad stainless steel having a low nickel thickness ratio and a sheet of nickel. That is, used as the clad materials in this Example were a nickel-clad stainless steel (SUS 304) having a total sheet thickness of 0.25 mm, a nickel cladding thickness of 5 μm, a sheet width of 100 mm and a length of about 10 m and a pure nickel sheet having a thickness of 0.25 mm, and also used as a separator material was a 0.2 mm thick heat-resistant steel of 18Cr3.5Al-Fe with a thin temper color formed thereon. The nickel-clad stainless steel, the nickel sheet and the separator material were taken up in this order as an overlaying order (with the nickel sheet on the nickel-cladding surface of the nickel-clad stainless steel) about a core material (SUS 304, diameter: 300 mm, width: 100 mm, thickness: 10 mm) to form a coil of 10 turns with the separator material present on the core material side in the beginning. In the take-up, the nickel-clad stainless steel and the separator material were drawn with a force of 500 to 1,000 kg, and the nickel sheet with a force of 30 to 50 kg. The separator material was arranged to be longer than the metal sheets as clad materials such that the outermost turn of the coil was part of the separator material, and the coil was finally tightened with the separator material. Then, the resultant coil was charged into a vacuum furnace under a vacuum of $10^{-5}$ Torr, heated to a temperature of 1,100° C., and held in the furnace for 1 hour to bond the clad materials, and then the coil was cooled. The coil was rewound, and a sample was taken from the resultant clad plate. The sample was subjected to a 90 degrees repeated bending test until it was ruptured (number of bending repetition until rupture: 10). The bending test was carried out in a manner that with a half side of the test piece held fast in a vise, the other half side was repeatedly bent and restored in two directions, i.e. forward and backward. The ruptured cross section was examined to show no separation. At room temperature, the coefficient of thermal expansion of the SUS 304 stainless steel was $17 \times 10^{-6}$/°C., that of nickel was $13.3 \times 10^{-6}$/°C., and that of the separator material was $10 \sim 11 \times 10^{-6}$°C.

EXAMPLE 2

Clad plate of invar and stainless steel:

As clad materials, there were used a nickel-clad stainless steel (SUS 304) having a total thickness of 0.25 mm, a nickel thickness of 5 μm, a sheet width of 100 mm and a length of about 10 m and an invar (36Ni-Fe alloy) having a sheet thickness of 0.15 mm, and used as a separator material was a 0.2 mm thick heat-resistant steel of 18Cr-3.5Al-Fe with a thin temper color formed thereon. The nickel-clad stainless steel, invar and separator material were taken up in this order as an overlaying order (with the invar sheet on the nickel-cladding surface of the nickel-clad stainless steel) about a core material (SUS 304, diameter: 300 mm, width: 100 mm, thickness: 10 mm) with a force of 500 to 1,000 kg to form a coil of 10 turns such that the separator material was present on the core material side in the beginning. The coil was finally tightened with the separator material which was arranged to form an outermost turn of the coil. Then, the resultant coil was charged into a vacuum furnace under a vacuum of $10^{-5}$ Torr, heated to a temperature of 1,050° C., and held in the furnace for 1 hour to bond the clad materials, and then the coil was cooled. The coil was rewound, and a sample was taken from the resultant clad plate. The sample was subjected to a 90 degrees repeated bending test until it was ruptured (number of bending repetition until rupture: 6), and the ruptured cross section was examined to show no separation. At room temperature, the coefficient of thermal expansion of the nickel-clad stainless steel was $17 \times 10^{-6}$/°C., that of invar was $1 \sim 2 \times 10^{-6}$/°C., and that of the separator material was $10 \sim 11 \times 10^{-6}$/°C.

EXAMPLE 3

Clad plate of copper and stainless steel:

As clad materials, there were used a nickel-clad stainless steel (SUS 304) having a total thickness of 0.25 mm, a nickel thickness of 5 μm, a sheet width of 100 mm and a length of about 10 m and a pure copper sheet having a thickness of 0.15 mm, and used as a separator material was a 0.2 mm thick heat-resistant steel of 18Cr-3.5Al-Fe with a thin temper color formed thereon. The nickel-clad stainless steel, copper sheet and separator material were taken up in this order as an overlaying order (with the copper sheet on the nickel-cladding surface of the nickel-clad stainless steel) about a core material (SUS 304, diameter: 300 mm, width: 100 mm, thickness 10 mm) to form a coil of 10 turns such that the separator material was present on the core material side in the beginning. In the take-up, the nickel-clad stainless steel and the separator material were drawn with a force of 500 to 1,000 kg and the copper sheet with a force of 20 to 30 kg. The coil was finally tightened with the separator material which was arranged to form an outermost turn of the coil. Then, the resultant coil was charged into a vacuum furnace under a vacuum of $10^{-5}$ Torr, heated to a temperature of 900° C., and held for 1 hour to bond the clad materials, and then the coil was cooled. The coil was rewound, and a sample was taken from the resultant clad plate. The sample was subjected to a 90 degrees repeated bending test until it was ruptured (number of bending repetition until rupture: 12), and the ruptured cross section was examined to show no separation. Further, the above procedure was repeated by changing the overlaying orders of the nickel-clad stainless steel and the copper sheet, which case showed that the resultant clad plate had insufficient bonding and caused separation when bent at 90 degrees twice. The reason is considered to be that since copper has low strength at high temperature, no thermal stress worked thereon. At room temperature, the coefficient of thermal expansion of the nickel-clad stainless steel was $17 \times 10^{-6}$/°C., that of the copper sheet was $16.5 \times 10^{-6}$/°C., and that of the separator material was $10 \sim 11 \times 10^{-6}$/°C.

EXAMPLE 4

Wide clad plate of nickel, stainless steel and copper:

As clad materials, there were used a coil of a nickel-clad stainless steel (SUS 304) having a total sheet thickness of 0.2 mm, a nickel thickness of 5 μm, a width of 600 mm and a length of about 200 m and a coil of copper having a sheet thickness of 0.05 mm, a width of 600 mm and a length of about 200 m. Also used as a separator material was a 0.2 mm thick, 600 mm wide and about 210 m long heat-resistant steel of 18Cr-3.5Al-Fe with a thin temper color formed thereon. These clad materials and separator material were taken up about a pipe-shaped core of a plain steel (diameter: 500 mm, width: 600 mm, thickness: 10 mm) in the following manner. At first, the separator material was wound about the core to form its coil of two turns, and then the nickel-clad stainless steel sheet, the copper sheet and the separator material were taken up about the coil in this order with the nickel cladding surface on the separator material and with the copper sheet on the other surface of the stainless steel sheet. In order to carry out the take-up neatly, the separator material was drawn with a force of 1,500 to 2,000 kg, the nickel-clad stainless steel sheet with a force of 1,500 to 2,000 kg respectively, and the copper sheet with a force of 100 to 150 kg. Further, the separator material was continuously wound to form additional outermost four turns to tighten the resultant coil. The coil was then charged into a vacuum furnace, heated to a temperature of 900° C. under a vacuum of $10^{-5}$ Torr, and held in the furnace for 1 hour to bond the clad materials, and then cooled. Then, the coil was rewound, and it was found that part each of the beginning and ending portions (about 10 to 15 m) of the coil had concave and convex shapes and bonding failure derived therefrom. However, the remaining portion (about 180 m) of the coil showed excellent bonding and good quality. The resultant coil was a threelayered clad plate of nickel, stainless steel and copper and had a thickness of 0.25 mm and a width of 600 mm.

In addition, a sample was taken from the resultant clad plate. The sample was subjected to a 90 degrees repeated bending test until it was ruptured (number of bending repetition until rupture: 11), and the ruptured cross section was examined to show no separation.

EXAMPLE 5

Wide clad plate of copper and stainless steel:

As clad materials, there were used a coil of stainless steel (SUS 304) having a sheet thickness of 6 mm, a width of 450 mm and a length of about 70 m and a coil of copper having a sheet thickness of 2 mm, a width of 450 mm and a length of about 70 m. Also used as a separator material was a 0.4 mm thick, 450 mm wide and about 130 m long heatresistant steel of 18Cr-3.5Al-Fe with a thin temper color formed thereon. At first, the separator material and the stainless steel were taken up directly on a coil take-up device to form a coil of one turn with the separator material on the inner circumference side. In the take-up, the separtor material was drawn with a force of 500 to 1,000 kg, and the stainless steel with a force of 5,000 to 10,000 kg respectively. Then, the copper sheet was laid on the stainless steel, and the clad materials and the separator material were taken up to form a coil of about 30 turns (about 70 m) while the separator material was drawn with a force of 500 to 1,000 kg, the stainless steel with a force of 5,000 to 10,000 kg and the copper sheet with a force of 300 to 500 kg respectively. Further, the separator material was taken up additional 20 turns to tighten the coil. The resultant coil had a weight of about 2.2 tons in total. The coil was charged in a vacuum furnace and heated to a temperature of 900° C. under a vacuum of $10^{-5}$ Torr, held in the furnace for 3 hours to bond the clad materials, and then cooled. Then, the coil was rewound, and it was found that each of the beginning and ending portions (about 5 m) of the coil had concave and convex portions and bonding failure derived therefrom. However, the remaining portion (about 60 m) of the coil showed excellent bonding and good quality. The resultant coil was a clad plate copper and stainless steel and had a thickness of 8 mm and a width of 450 mm.

In addition, a sample was taken from the resultant clad plate. The sample was subjected to a 90 degrees repeated bending test until it was ruptured (number of bending repetition until rupture: 10), and the ruptured cross section was examined to show no separation.

What is claimed is:

1. A process for producing a clad plate which comprises:

a first step of forming a coil by taking up two or more metal sheets as clad materials and a thin sheet of heatresistant steel which works as a separator material while these members are overlaid on one another, and a second step of heat-treating the resultant coil in vacuo.

2. A process according to claim 1 wherein the metal sheets have a thickness of between 4 μm and 30 mm.

3. A process according to claim 1 wherein the separator material is a heat-resistant steel having a thin oxide film on the surface.

4. A process according to claim 1 wherein the coil is formed about a core material.

5. A process according to claim 4 wherein the coil is formed by using a material having a high coefficient of thermal expansion as a core material and the outermost turn of the coil is part of a metal sheet or separator material having a low coefficient of thermal expansion.

6. A process according to claim 4 wherein the coil is formed by taking up two or more metal sheets and the separator material with the separator material on the core material side and metal sheets thereon.

7. A process according to claim 6 wherein the separator material has a larger length than the two or more metal sheets and the outermost turn of the coil is formed of part of the separator material.

8. A process according to claim 1 wherein the coil has an innermost turn of part of a heat-resistant steel and the heat-resistant steel is the separator material or one of the two or more metal sheets.

9. A process according to claim 8 wherein the coil has an outermost turn of a part of the separator material.

10. A process according to claim 1 wherein the coil is formed by taking up the two or more metal sheets and the separator material with the separator material on the innermost side of each turn, a metal sheet having a low coefficient of thermal expansion on the outer circumference side of each turn and a metal sheet having a high coefficient of thermal expansion on the inner circumference side of each turn.

11. A process according to claim 1 wherein the two or more metal sheets comprise a metal sheet having a high strength at high temperature and a metal sheet having a low strength at high temperature, and the metal sheet having a low strength at high temperature is disposed between the metal sheet having a high strength at high temperature and the separator material.

12. A process according to claim 1 wherein the two or more metal sheets have a solder disposed in at least one interface therebetween.

13. A process according to claim 12 wherein at least one metal sheet of the two or more metal sheets has a surface having a bonded solder and being directed to the other metal sheet.

14. A process according to claim 1 wherein one of the two or more metal sheets is a stainless steel sheet having a thin nickel layer on at least one surface thereof and the nickel layer is laminated on the other metal sheet.

15. A process according to claim 1 wherein the vacuum heat-treating is carried out at a degree of vacuum of between $1 \times 10^0$ and $1 \times 10^{-7}$ Torr.

* * * * *